Dec. 14, 1943.  F. J. PEPERSACK  2,336,700

DRAIN VALVE

Filed May 5, 1942

Inventor
FRANCIS J. PEPERSACK,

By George Douglas Jones
Attorney

Patented Dec. 14, 1943

2,336,700

UNITED STATES PATENT OFFICE 2,336,700

DRAIN VALVE

Francis J. Pepersack, Towson, Md., assignor to The Glenn L. Martin Company, Middle River, Md., a corporation of Maryland Application May 5, 1942, Serial No. 441,777

5 Claims. (Cl. 251—131)

This invention relates to valves, and particularly to a valve construction which is adapted for use as a drain valve under conditions of extreme vibration such as are encountered in vehicle fuel tanks.

A principal object of this invention is to provide a simple and efficient valve of the character described which can be readily operated, and which cannot become accidentally opened or loosened in use.

In the accomplishment of this principal object, a feature of the invention consists in the provision of a passaged valve housing containing a spherical valve ball of resilient material, a plunger or valve stem for holding the valve ball in its closed position, and means cooperating with the plunger or stem for positively retaining it in valve closing position. All of these parts except the valve ball will ordinarily be made from suitable metal.

Another and specific feature of the invention is found in the provision of a cam surface cooperating with a projection of the valve plunger to aid in compressively distorting the resilient valve ball as it is seated in closing position, and of a dwell or notch at the highest point of the cam surface for preventing withdrawal or turning of the valve plunger when the resilient valve ball is acting to hold the projection of the plunger against the notch or dwell of the cam surface.

Still further features of improvement are to be found in the flattened shape given the plunger to permit fluid passage, and the form and arrangement of the cam means so that only a partial turn of the plunger is necessary to seat the valve ball and place the plunger in position where it will be retained by the dwell of the cam means.

Another specific object is to provide a valve of the type described with a detachable, tubular bushing member formed to supply the cam means, and arranged to retain the valve ball and the plunger in assembled operative relation within the valve housing.

Further novel features of improvement contributing to simplicity in manufacture and efficiency in operation will be perceived and readily understood from the following detailed description of a preferred embodiment of the invention taken in connection with the accompanying drawing, in which Fig. 1 is a vertical section of the assembled valve;

Figure 1:
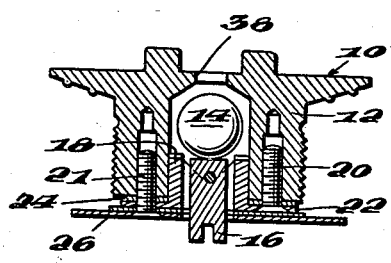

In the drawing, 10 refers generally to a complete drain valve comprising, as indicated in Fig. 1, a generally tubular housing 12, a spherical valve ball 14, preferably of rubber-like material which is resistant to the action of liquid hydrocarbons, a rotatable and slidable valve plunger or stem 16, and a valve sleeve or cam bushing 18 for supporting and guiding the plunger. It will be noted that the valve sleeve 18 is detachably maintained in assembled relation within the housing 12 by means of a plurality of circumferentially spaced retaining screws 20 and 21, passing through a circular flange 22 at the outer end of sleeve 18. While all of the screws 20 and 21 extend through the flange 22 and a gasket 24 on the adjacent end of the housing 12, and are threadedly engaged by the tubular housing 12, one of these screws, such as 20, may be used to assemble the valve preliminarily so that the remaining screws 21 may be passed also through a laminated structure 26 in order to secure the valve 10 in position.

Figure 5:
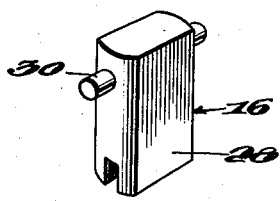
Fig. 5 is a perspective view of the valve plunger or stem.
Figure 6:
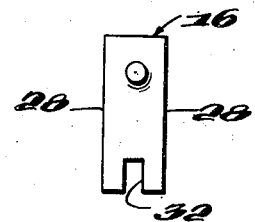
Fig. 6 is a side elevation of this valve plunger.

It will be observed that the valve plunger or stem 16 is formed to provide opposed flats or lateral sides 28, 28 and intermediate, opposed arcuate portions 29, 29, so that fluid passage is always possible through the valve sleeve 18, and the plunger 16 will be rotatable and slidable therein without appreciable lateral movement. Near its inner end the plunger or stem 16 is formed with one or more projections 30, as by a pin passing therethrough and extending from the arcuate side portions 29, 29. As will be seen in Figs. 5 and 6, the outer end of the plunger 16 has a slot or indentation 32 to receive a turning tool.

Figure 2:
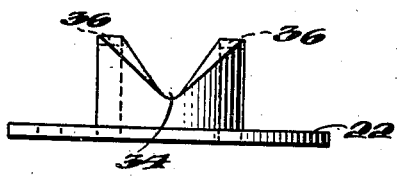
Fig. 2 is a side elevation of the valve sleeve or cam bushing.
Figure 3:
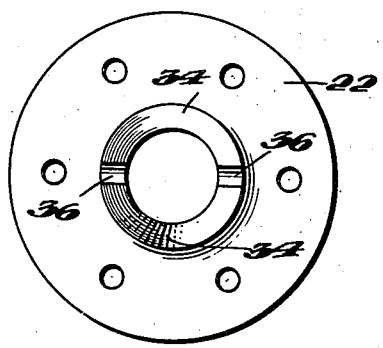
Fig. 3 is a top plan view of this valve sleeve.
Figure 7:
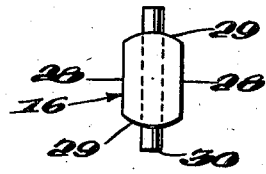
Fig. 7 is a top plan view.
Figure 8:
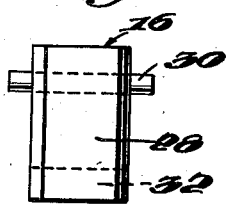
Fig. 8 is a front elevation of the valve plunger.
Figure 4:
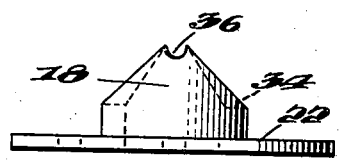
Fig. 4 is an end elevation of the same valve sleeve.

With reference to Figs. 2, 3 and 4, it will be noted that the valve sleeve or bushing 18, in which the valve stem 16 turns and slides loosely, is formed with an opposed pair of V-shaped notches 34 extending from the inner end of the sleeve toward the outer end, and each slightly less than half way around the sleeve. These notches receive the valve stem projections 30, 30 loosely at their bottoms and afford cam portions leading to a pair of dwells 36, 36 of semi-circular, notch shape diametrically spaced at the inner end of the sleeve 18 between the two notches

34. These semi-circular notches 36 are deep enough to prevent turning of the valve plunger 16 when its projections 30 are resting therein.

With regard to the operation of the valve which has been described in detail, Fig. 1 indicates the open or drain position in which the tubular valve ball 14 rests loosely within the tubular housing 12 and away from a valve seat opening 38 at the upper end. In this position fluid can flow through the opening 38 past the valve ball 14, past the flat sides 28, 28 of the plunger 16, and out through the laminated structure 26. To close the valve, a screw driver may be inserted in the slot 32 in the outer end of the plunger 16 and then turned to cause the projections 30, 30 to progress up the opposite cam surfaces on the notch portions 34, 34 until the dwell notches 36, 36 receive them. The resilient valve ball 14 is of such a size and so disposed with regards to the plunger 16 and the cam bushing 18 that compressive distortion of the ball 14 will be necessary before the projections 30 can rest in the notches or dwells 36, thus insuring a tight seal and that no amount of vibration will be sufficient to dislodge these projections and cause the valve to open unintentionally. In the closed position, the plunger 16 will not extend beyond the structure 36. It will be obvious that opening of the valve is accomplished by raising and turning the plunger 16 sufficiently to increase the compression of the valve ball 14 and permit release of the projections 30 from the notches 36.

In this manner, a drain valve has been provided which can be operated by a quarter turn in either direction and which will remain constantly closed in use. Actual tests of this particular valve have proved that it is capable of resisting the extreme vibration present in the structure of any vehicle.

While only a preferred embodiment of the invention and its operation have been described, it will be apparent to those skilled in the art that numerous changes can be made in the details of construction and arrangement of the parts without departing from the spirit of the invention and the scope of the appended claims.

Having thus described the invention, what is claimed as new and desired to be secured by Letters Patent of the United States is:

1. A valve comprising an extended housing, a passage through said housing having a valve seat adjacent one end; a resilient valve ball retained loosely within said housing and adapted to rest upon said valve seat in closed position; a longitudinally slidable member in said passage for holding the valve ball on the valve seat, said member formed to provide a passage for fluid through the housing; and means for positively retaining the ball retaining member in a predetermined fixed position against the valve ball when the valve ball is seated, said last means being formed and arranged to require compressive distortion of the ball valve before the fixed position is attained.

2. A valve comprising an extended housing, a passage through said housing having a valve seat adjacent one end; a resilient valve ball positioned loosely and freely within said housing and adapted to rest upon said valve seat in closed position; a longitudinally slidable ball actuating member in said passage for holding the valve ball on the valve seat and formed to provide a passage for fluid through the housing, said member having a lateral projection; and means secured within the housing and including a notched portion for positively retaining the projection of the member and preventing its outward movement when the valve ball is seated.

3. A valve comprising a tubular housing formed to provide a valve seat at one end; a valve ball of deformable rubber-like material loosely contained within the housing and being of a size to close one end of the housing when resting on the valve seat; a member slidable within the housing and cooperating with the valve ball to urge it into seated position, said member being formed to provide a fluid passage when the valve is open; and cam means located within the housing and having a dwell adjacent its inner end, said member being formed to provide projecting means arranged to engage the cam means progressively and to rest on the dwell when the member is in position to hold the valve ball seated.

4. A valve of the character described comprising a housing construction providing a tubular passage; a resilient valve ball loosely confined within the tubular passage and adapted to seal one end thereof; a sleeve member secured within the other end of the tubular passage; and a valve operating stem slidably and rotatably mounted in the sleeve member and having a projection for preventing its removal from the housing construction, said valve operating stem being formed to provide a fluid passage through the sleeve member, and said sleeve member being notched at its inner end to form a cam surface rising to a dwell portion shaped to receive and retain the projection of the valve stem when the valve ball is held in sealing relation to the one end of the tubular passage.

5. A valve of the character described comprising a housing construction providing a tubular passage; a valve ball of rubber-like material loosely confined within the tubular passage of the housing and adapted to seal one end thereof; a bushing sleeve secured within the other end of the tubular passage; and a valve operating plunger slidably and rotatably mounted in the bushing sleeve and having a pair of pin projections on opposite sides of its upper end, said valve operating plunger being formed with flat lateral portions to provide a fluid passage through the bushing sleeve, and said bushing sleeve being provided with diametrically opposed cam notches in its inner end and joined by two dwell portions shaped and arranged to receive and retain the respective pin projections when the valve operating plunger is given a partial turn in either direction to cause the pin projections to rise on the cam notches and force the valve ball into sealing position.

FRANCIS J. PEPERSACK.